United States Patent
Wyatt et al.

[11] Patent Number: 5,774,484
[45] Date of Patent: Jun. 30, 1998

[54] TWO-STAGE MONO-MODE OPTICAL FIBRE LASER

[75] Inventors: Richard Wyatt, Felixstowe; Jonathan R. Armitage, Ipswich, both of Great Britain

[73] Assignee: British Telecommunications PLC, London, England

[21] Appl. No.: 688,003

[22] Filed: Jul. 29, 1996

Related U.S. Application Data

[63] Continuation of PCT/GB95/00163, Jan. 27, 1995 published as WO95/20831, Aug. 3, 1995 continuation of Ser. No. 241,895, May 13, 1994, Pat. No. 5,422,897.

[30] Foreign Application Priority Data

Jan. 28, 1994 [EP] European Pat. Off. .............. 94300665

[51] Int. Cl.$^6$ ...................................................... H01S 3/07
[52] U.S. Cl. ............................................... 372/6; 372/102
[58] Field of Search ................................. 372/6, 102, 50, 372/101, 69

[56] References Cited

U.S. PATENT DOCUMENTS

| | | | |
|---|---|---|---|
| 3,808,549 | 4/1974 | Maurer ........................................ | 372/6 |
| 5,263,036 | 11/1993 | De Bernardi et al. ...................... | 372/6 |
| 5,321,718 | 6/1994 | Waarts et al. ............................. | 372/108 |
| 5,426,656 | 6/1995 | Tohmon et al. ............................ | 372/6 |
| 5,436,919 | 7/1995 | Chwalek et al. ........................... | 372/50 |

FOREIGN PATENT DOCUMENTS

056917A1 11/1993 European Pat. Off. .

OTHER PUBLICATIONS

Chernikov et al. "Coupled–Cavity Erbium Fiber Lasers Incorporating Fiber Grating Reflectors", Optics Letters, vol. 18, No. 23, 1 Dec. 1993, New York, pp. 2023–2025.
Ball et al, "Modeling of Short, Sigle–Frequency Fiber Lasers in High–Gain Fiber", IEEE Photonics Technology Letters, vol. 5, No. 6, 5 Jun. 1993, New ork, pp. 649–651.
Piehler, "Unconversion Process Creates Compact Blue/Green Lasers", Laser Focus World, vol. 19, No. 11, Nov. 1993, Tulsa, pp. 95–102.
Po, "High Power Neodymium–doped Single Transvere Mode Fibre Laser", Electronics Letters, vol. 29, No. 17, 19 Aug. 1993, Engage, GB, pp. 1500–1501.
Eisenstein et al, "High–Power Extended–Cavity Laser at 1.3 $\mu$m with a Single–Mode Fiber Output Port", Applied Physics Letter 50(22), 1 Jun. 1987, pp. 1567–1568.
"Narrow Line Semiconductor Laser Using Fibre Grating", Electronics Letters, 20$^{th}$ Jun. 1991, vol. 27, No. 13, pp. 1115–1116. Bird et al.
Leger et al, "Geometrical Transformation of Linear Diode–Laser Arrays for Longitudinal Pumping of Solid–State Laser Arrays for Longitudinal Pumping of Solid–State Lasers", IEEE Journal of Quantum Electronics, Apr. 1992 7 pages.
Kogelnik et al, "Coupled Wave Theory of Distributed Feedback Lasers", J. Apply. Phys. vol, 43, No. 5, May 1972, pp. 2337–2334.

(List continued on next page.)

*Primary Examiner*—Rodney B. Bovernick
*Assistant Examiner*—Yisun Song
*Attorney, Agent, or Firm*—Nixon & Vanderhye, PC

[57] ABSTRACT

A high power monomode laser arrangement is able to manipulate the output from a high power laser diode array pump source using a computer-generated hologram to launch a high proportion of the pump source light into a multimode fibre portion including input reflector. A monomode fibre portion with the same fundamental-mode spot size as the multimode fibre portion is optically coupled to the multimode fibre portion and includes a reflector which reflects only the fundamental mode of the multimode and monomode fibre portions. The fundamental mode reflection forced by the monomode fibre portion provides the feedback necessary to force predominantly fundamental mode oscillation which enables stimulated emission in only the fundamental mode.

25 Claims, 1 Drawing Sheet

OTHER PUBLICATIONS

Allain et al, "Ytterbium–Doped Fluoride Fibre Laser Operating at 1.02 µm", Electronics Letters, 21$^{st}$ May 1992, vol. 28, No. 11, pp. 988–989.

Brierley et al, "Visible fibre lasers", BT Technol. J, vol. 11, No. 2, Apr. 1993, 9 unnumbered pages.

Allain et al, "Red Upconversion Yb–Sensitised Pr Fluoride Fibre Laser Pumped in 0.8 µm Region", Electronics Letters, 20$^{th}$ Jun. 1991, vol. 27, No. 13, pp. 1156–1157.

Smart et al, "CW Room Temperature Upconversion Lasing at Blue, Green and Red Wavelengths in Infrared–Pumped $Pr^{3+}$–Doped Fluoride Fibre", Electronics Letters, 4$^{th}$ Jul. 1991, vol. 27, No. 14, pp. 1307–1308.

Kashyap et al, "All–Fibre Narrowband Reflection Gratings at 1500 nm", Electronics Letters, 24$^{th}$ May 1990, vol. 26, No. 11, pp. 2 unnumbered pages.

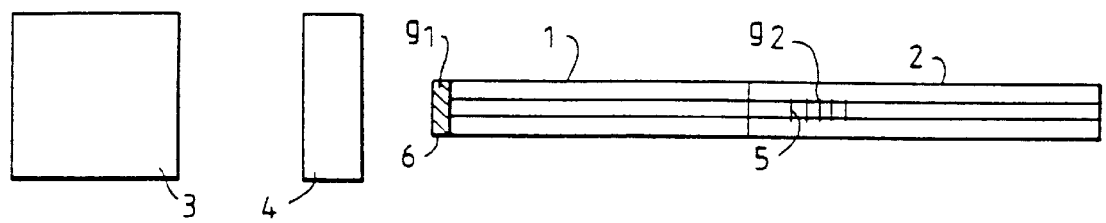
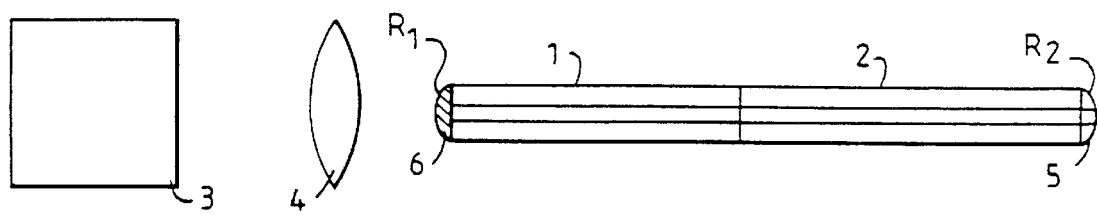
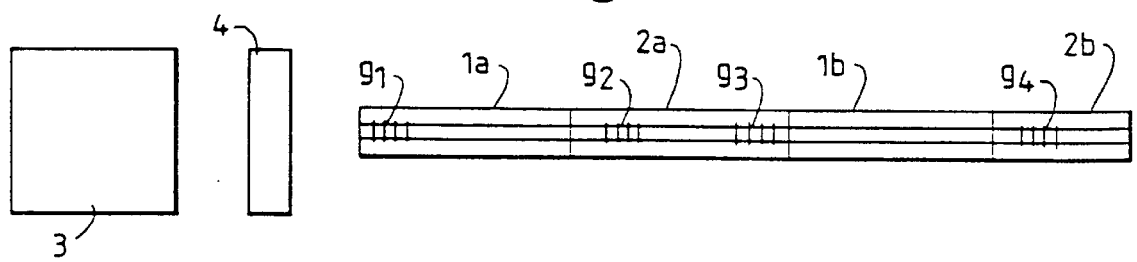

TWO-STAGE MONO-MODE OPTICAL FIBRE LASER

This is a continuation of PCT application PCT/GB95/00163 filed 27 Jan. 1995 published as WO95/20831, Aug. 3, 1995 which in turn is a continuation of U.S. application Ser. No. 08/241,895 filed 13 May 1994 and now U.S. Pat. No. 5,422,897 issued Jun. 6, 1995.

FIELD OF THE INVENTION

This invention relates to optically pumped lasers and in particular but not exclusively to lasers which produce a substantially single transverse mode output.

BACKGROUND OF THE INVENTION

Diffraction limited, monomode output, optically pumped lasers, which use a simple, single pump source arrangement and are capable of producing monomode outputs around 100 mW, are useful for small-signal or low power applications. However, such lasers are not easily adapted to produce higher monomode powers, in the order of Watts.

Optically pumped lasers capable of producing higher power monomode outputs, in the order of Watts, have typically required complex combinations of more than one pump source to provide high pump powers. Methods of combining pump sources have included: multiplexing several single transverse mode diode lasers of different wavelengths; polarisation multiplexing two or more such diodes into a fibre cavity, the fibre being pumped from both ends of the cavity; and, the use of multiple pumping ports along the length of a fibre laser cavity.

A possible single optical pump source for a high power laser which can produce optical output powers in the order of Watts is a diode-laser array. Diode-laser arrays can be fabricated with high electrical to optical efficiencies and are very reliable. However, they suffer from two major drawbacks: the lasers in the array are substantially mutually incoherent, which means the ability to focus the output is poor; and the geometry of the array is generally a poor match to the application with which it would be used.

An optical coupling device for manipulating the outputs from a high power, linear diode-laser array (LDA), to form a two-dimensional, symmetric virtual source, to end-pump a Nd:YAG laser, is described in a paper "Geometrical Transformation of Linear Diode-Laser Arrays for Longitudinal Pumping of Solid-State Lasers", IEEE Journal of Quantum Electronics, Vol. 28, No. 4, April 1992. In the device, two planes of surface relief binary optics were implemented to transform the linear array outputs into a 2-D spot source with radiance approaching the maximum possible according to the Radiance Theorem, and symmetrized shape and divergence.

An alternative method of converting the output of a diode-laser array to a focused spot uses a computer generated hologram (CGH).

To enable maximum launch of optical power from a high power pump source such as a diode-laser array into a laser cavity, even if using the above-mentioned coupling methods, it is preferable for the cavity to have a large numerical aperture (NA). Such a large NA provides that the cavity will probably be multimode at the pump source wavelength.

Although an LDA is the preferred pump source in the present invention, any other source, which is capable of supplying the necessary, high power, optical output, may be used.

One form of waveguide arrangement which is able to use a multimode pump source to produce a substantially monomode output is the 'Polaroid' type optical fibre, available from the Polaroid Corporation.

This arrangement consists of an elliptical outer core, which is undoped, into which the pump input is launched, and an inner, circular, doped core. However, this arrangement has an extremely complex structure, which makes fabrication very difficult. Also, performance is highly dependent on launch conditions of energy into the fibre, which are complicated, again, by the shape of the outer core.

SUMMARY OF THE INVENTION

According to a first aspect the present invention provides a laser comprising: an optical source to provide a pump signal at a wavelength of $\lambda_1$; a first waveguide portion which when optically pumped at a wavelength $\lambda_1$ is capable of laser action with an emission at wavelength $\lambda_2$, the first waveguide portion exhibiting multimode behaviour at $\lambda_2$; a second waveguide portion which exhibits substantially single mode behaviour at $\lambda_2$, the first and second waveguide portions being optically coupled together; and an optical cavity, the optical cavity being defined by feedback means and including the first and second waveguide portions.

Advantageously, a diode-laser array can be used as the pump source, which is able to produce high pump powers at a relatively low cost. However, if a diode-laser array is used it may be necessary to manipulate the output from the array to couple it efficiently into the first waveguide portion. An arrangement incorporating a combination of cylindrical and spherical lenses, a computer generated hologram (CGH) or surface relief binary optics, or a combination of any of the former, enables such a source to be used efficiently.

For the laser cavity it is preferable, but not essential, that the two waveguide portions have substantially the same fundamental mode spot size at the lasing wavelength as this facilitates efficient energy transfer of the fundamental mode between the portions.

In a preferred embodiment, optical fibres are the medium for the optical waveguides in the optical cavity, as they are relatively cheap and readily obtainable in comparison to other possible mediums such as planar waveguides.

Although fibre waveguides are the preferred medium for the laser, it is of course possible to utilise other forms of waveguide, for example, planar waveguides or semiconductor waveguides. A further advantage of using doped fibre or planar waveguides is that they exhibit energy storage capability and are thus suitable for high energy, pulsed wave applications, whereas semiconductor waveguides exhibit a far smaller energy storage capability (in the order of $10^7$ less storage ability) and are, thus, not so suited to high energy pulsed wave applications. The energy storage capability of fibre and planar waveguides is due to the fact that the lifetime of an ion in its upper energy band is in the order of milliseconds and can be up to 10 ms, whereas the lifetime of ions in the upper energy level of a semiconductor waveguide is in the order of nanoseconds.

Advantageously, the use of fibre waveguide portions facilitates connection of the waveguides by fusion splicing. However, other methods may be used, for example, by butting them together using a mechanical splice, or by using an optical connector. Fusion splicing is, however, preferred due to the achievable joint accuracy which reduces energy loss and unwanted reflections at the joint due to mismatch.

The preferred host, particularly for an optical fibre waveguide laser, is silica in which the preferred dopant is ytterbium, although alternative dopants, for example erbium or neodymium, can be incorporated. Silica is the preferred host because it is generally cheaper and more easily fusion-spliced and is more readily available than other suitable hosts. Ytterbium is the preferred dopant because, as one of the simpler rare earth elements, with only one excited energy level, it is free from quenching mechanisms which limit gain. This means that very high dopant concentrations may be achieved without quenching effects becoming a problem. This would not be the case if erbium or neodymium, for example, were the dopants, due to their more complex energy level structures.

Fibre hosts other than silica may be used, for example, fluoride fibre, where one skilled in the art would be aware that choice of host and dopant depends on the laser transition required.

In a preferred embodiment, alumina is incorporated in the multimode fibre as a primary co-dopant, where alumina has index raising properties. The alumina also has the desirable effect of broadening the gain bandwidth of the device by preventing clustering of ytterbium ions (or any other rare-earth element used) in the multimode fibre, by improving the solubility of the primary dopant ions in the host without significantly degrading performance in other ways.

In a further embodiment, germania is included as a primary co-dopant in the silica host, to facilitate the writing of optical gratings into the refractive index of the host. The germania also acts as an index-raising co-dopant in silica fibres.

Typically, the refractive index profile of a silica multimode fibre co-doped with alumina is bell-shaped due to the presence of the alumina, where it is well known in the art of optical fibre fabrication that the alumina causes the bell-shape by preventing on-axis dip.

Reflectors act as feedback means for the cavity to provide the feedback necessary for laser operation. The reflectors can be of any type, for example, mirrors or gratings.

In a preferred embodiment the reflectors which define the input and output sides of the cavity are gratings. An advantage of using gratings is that they are highly wavelength selective. In addition, gratings can be formed actually within the waveguide or fibre, avoiding alignment problems and the need for discrete components. The or each grating may be written into the refractive index of the waveguides, for example in the fibre core.

An alternative reflector arrangement incorporates a mirror in place of the or each grating.

A laser according to the present invention has the advantage over known lasers that an efficient monomode output can be achieved utilising a simple pump arrangement.

Under normal lasing conditions, the lasing wavelength is longer than the pump wavelength. However, there is a possibility, depending on laser configuration and pump conditions, that the lasing wavelength can be shorter than the pump wavelength. This possibility is known as up-conversion lasing.

An up-conversion laser typically provides an output light beam having a wavelength shorter than the wavelength of its pump source. Several types of up-conversion mechanism are known. The simplest forms of up-conversion rely either on ion-ion interactions or ESA (excited state absorption). In the former, two ions are excited to a first energy level and one of the ions transfers its energy to the other ion: the first ion returns to its lower state and the second is elevated to a higher state. In the latter, an ion absorbs one photon of light and is elevated to an excited state where it absorbs a further photon and is elevated to a higher excited state.

In their simplest forms, both ion-ion interaction and ESA up-conversion only rely on one pump beam and transitions between the three states require similar energy absorption levels. However, more complex forms of up-conversion which may be implemented in accordance with the present invention are discussed below.

The skilled person will be aware that, beyond the cut-off wavelength of an optical fibre, or the wavelength at which an optical fibre supports only a single mode, a fibre becomes progressively more non-guiding and hence more inefficient. Typically, to provide monomode lasing, a doped fibre is designed such that lasing occurs at or just beyond the cut-off wavelength. However, for up-conversion lasing, if lasing occurs at just beyond the cut-off wavelength of a doped fibre, the longer wavelength pump will be inefficiently supported by the fibre. Typically, therefore, up-conversion lasers are necessarily pumped at or around the cut-off wavelength of doped fibre, where the pump beam is supported in a single mode, to ensure efficient pump light usage. A result of this is that, if up-conversion lasing occurs, it is typically supported in the doped fibre in several modes at least. Monomode pumping is typically the optimum pumping regime. However, a pumping scheme using a pump wavelength supported by the waveguide in a few modes, providing lasing in an even greater number of modes, is still a worthwhile option, but not an optimum option.

According to a second aspect the present invention provides an up-conversion fibre laser which exhibits laser action at a lasing wavelength when pumped with at least one pump wavelength substantially longer than the lasing wavelength, the laser comprising: at least one optical source to provide a pump signal at the or each pump wavelength; a first fibre waveguide portion which when optically pumped at the or each pump wavelength is capable of laser action with a multi-traverse mode emission at the lasing wavelength; a second fibre waveguide portion which exhibits substantially monomode behaviour at the lasing wavelength, the first and second fibre waveguide portions being optically coupled together; and, an optical cavity, the optical cavity being defined by feedback means and including the first and second waveguide portions.

Preferably, the pump for the up-conversion laser is a monomode source. Preferably also, the first fibre waveguide portion is optimised to exhibit monomode behaviour at at least one of the pump wavelengths.

Advantageously, a laser according to the present invention could provide the intensity of monomode pump source necessary to support the up-conversion process. Therefore, it would be possible for an up-conversion laser according to the present invention to be pumped by another laser according to the present invention but with a different dopant species or arrangement.

In a preferred embodiment of the present invention, the laser is an up-conversion laser which lases in the blue region of the visible spectrum. To enable this, the first fibre waveguide portion comprises a fluoride fibre as the host and is doped with thulium, and the pump is also a laser according to the present invention in which the first fibre waveguide portion has neodymium as it primary dopant, which causes the laser to lase at substantially 1.1 $\mu$m.

Alternatively, a different pump may be used which produces a high intensity output at substantially 1.1 $\mu$m.

Other preferred embodiments will become apparent with reference to the following description and claims.

BRIEF DESCRIPTION OF THE DRAWINGS

The invention will now be described by way of example with reference to the accompanying drawings in which:

FIG. 1 is a diagrammatic representation which illustrates one arrangement of apparatus for the present invention;

FIG. 2 is an alternative arrangement to FIG. 1.

FIG. 3 is a diagrammatic representation which illustrates a possible 2-stage arrangement in which a first form of the present invention, as the first stage, is used to provide a pump source for the second stage which is an alternative form of the present invention.

DETAILED DESCRIPTION OF THE DRAWINGS

Referring to FIGS. 1 and 2, a laser comprises a first waveguide portion (1) optically coupled at one end thereof to one end of a second waveguide portion (2), means (5, 6) incorporated with the waveguides which define an optical cavity, an optical source (3) for providing optical pump power and a coupling means (4) for coupling the optical pump power into the first waveguide portion.

The waveguide portions comprise optical fibre. The first fibre waveguide portion (1), which is a multimode fibre at the lasing wavelength, is fusion spliced to a second fibre waveguide portion (2) which is substantially monomode at the required lasing wavelength. The first fibre waveguide portion which exhibits substantially multimode behaviour at the lasing wavelength and the second fibre waveguide portion which exhibits substantially monomode behaviour at the lasing wavelength will, for ease of description only, hereinafter be referred to as the multimode and monomode fibres respectively.

The laser host is silica in which the dopant is ytterbium. Germania is included as a primary co-dopant in the silica host. The germania acts as an index-raising co-dopant in the multimode fibre, which is desirable for reasons discussed below. Germania also facilitates the writing of optical gratings into a fibre host, the details and advantages of which are also discussed below.

Alumina is incorporated in the multimode fibre as a secondary co-dopant, where alumina also has index raising properties. The alumina also has the desirable effect of broadening the gain bandwidth of the device by preventing clustering of ytterbium ions (or any other rare-earth element used) in the multimode fibre, without significantly degrading performance in other ways.

Typically, the refractive index profile of the multimode fibre is bell-shaped due to the presence of the alumina, where it is well known in the art of optical fibre fabrication that the alumina causes the bell-shape by preventing on-axis dip.

The multimode fibre is arranged to have as high a value of $\Delta n$ as possible to enable optimum coupling of light from the pump source into the multimode fibre. As indicated above, alumina and germania both have index raising properties and are typically, but not necessarily, both included as co-dopants for this reason. Typically the value of $\Delta n$ is 0.04, with the maximum value possible for silica or fluoride glass being, at present, around 0.06. The single mode fibre is chosen to have a low value of $\Delta n$ to help ensure that the fibre is monomode at the lasing wavelength, $\Delta n$ is typically around 0.004. The lower limit of $\Delta n$ for the monomode fibre is determined by how much bending loss can be tolerated in this fibre, since bending loss increases as $\Delta n$ decreases. In practice, the minimum value of $\Delta n$ for the monomode fibre should be around 0.001, below which, bending losses become excessive. Due to the limits on $\Delta n$ mentioned above, the $\Delta n$ ratio between the multimode and monomode fibres will typically be about 10.

The core sizes of the two fibres are chosen so that the fundamental mode spot size of the multimode fibre substantially matches that of the monomode fibre so that efficient coupling of the fundamental modes of the fibres is achieved between the fibres at their coupled ends. Whilst mismatch between fundamental mode spot sizes reduces the efficiency of the laser, the applicants discovered that a 65% mismatch in the spot sizes only reduces the efficiency of the laser by 10%. However, it is desirable for the fibres to be chosen so that a large fraction of the fundamental mode signal passes across the boundary to prevent significant performance reduction.

Since the refractive index profile of the multimode fibre is bell-shaped, the centering of the splice coupling the fibres ensures efficient coupling of the required mode. Again, however, in the same way that spot size matching is not essential, off-centre coupling of the fibres can be tolerated as long as a large fraction of the fundamental mode signal passes across the boundary. Mismatch can be calculated quite easily using overlap integral analysis which is well known in the art.

The optical source (3) is a laser diode array (LDA) which is capable of emitting up to several Watts of optical power at a specified wavelength. The array elements of the diode array are typically arranged linearly and thus their optical output needs manipulating (circularising) to achieve optimum coupling of power into the multimode fibre. The manipulating process is performed by a computer generated hologram (CGH) which is positioned intermediate the optical source and the input end of the multimode fibre.

In practical terms, the coupling efficiency from the LDA into the multimode fibre waveguide portion is about 50%: custom-made arrays of the required type being obtainable from Spectra-Diode Labs.

Assuming a coupling efficiency of 50%, the power requirement for the LDA can be estimated quite easily. For example, to provide a 0.5 W laser output from the present laser (which could be used as a high power pump source suitable for use with a fibre laser amplifier), it is predicted that between 1 and 1.5 W of power would be required in the multimode waveguide portion. 50% coupling efficiency from the LDA means that the LDA would need to provide at least 3 W of optical power.

Reflectors provide the feedback necessary for laser operation. The reflectors can be of any type, for example, mirrors or gratings. Preferably, as shown in FIG. 1, the reflectors are gratings, where $g_1$ is a grating which defines the input side of the cavity, and $g_2$ is a grating which defines the output side of the cavity. The cavity is, in effect, defined by the gratings and incorporates the fibre arrangement, where $g_1$ defines the cavity limit on the multimode fibre side and $g_2$ defines the cavity limit on the monomode fibre side.

Grating $g_1$ operates as an optical filter, which is written into the multimode fibre using UV radiation, (as described below), and is highly reflecting at the lasing wavelength and highly transmitting at the pump signal wavelength. The grating $g_1$ defines the input end of the laser cavity.

Grating $g_2$ is a wavelength selective, partially reflecting, grating, which is written into the monomode fibre using UV radiation (as described below). This grating defines the output end of the laser cavity. The skilled person would be aware of the design considerations to provide the necessary grating specification.

A suitable method of writing reflection gratings, using ultra violet radiation, is described in detail in the paper by Kashyap et al at page 730–731, Electronics Letters, 24th May 1990, Vol. 26, No. 11, which is herein incorporated by this reference. In simple terms, UV radiation from two beams is used to form a periodic interference pattern in the fibre in which the grating is required. The interference pattern modifies the refractive index of the fibre in a corresponding periodic fashion, and it is this refractive index variation which forms the optical grating. Typically, to facilitate grating formation, the fibre host is silica and is doped with germania. The specific properties of the grating depend on the period and length of the grating in the fibre, wavelength selectivity being controlled by varying the same.

Grating $g_2$ provides narrow band, partial reflection of the fundamental mode of operation of the monomode fibre at the lasing wavelength, which provides the necessary feedback to promote lasing in the fundamental mode of operation.

Typically a multimode optical fibre has many transmission modes, or guided wave modes, in which optical energy travels in the fibre. As well as travelling in guided wave modes, optical signals in one mode couple to other modes during transit along a fibre, thus it is difficult to control the amount of optical energy that exists in any single mode at any given time.

The applicants have discovered that the fundamental mode of a multimode fibre can propagate down a multimode fibre for distances of up to one meter, if the fibre is nominally straight, without there being significant coupling of power into higher order modes.

Parameter values for the present system depend on many trade-offs which exist in the system design. For example, where a specific optical gain is required in the laser cavity, the level of gain depends, for example, on the dopant species, dopant level, length of active region and the reflectivity of the reflectors, particularly in the monomode fibre waveguide portion. Within limits, increasing dopant levels typically means that the length of the active region can be reduced. However, when the dopant is a rare earth metal ion, high dopant concentrations typically lead to loss of performance due to quenching mechanisms. However, ytterbium is free from these quenching mechanisms because, as one of the simpler rare earths, it only has one excited energy level. Therefore, very high dopant concentrations may be applied without the above-mentioned affects becoming a problem. Thus, with ytterbium as dopant the dopant level can be up to 10 weight % or more. With erbium or neodymium dopants, for example, quenching effects are a problem at such a high dopant concentration. The lower limit of dopant concentration depends on the length of the doped region in the waveguide, although dopant levels of less than 0.25% are not generally implemented. Although some rare earth dopant concentration may be as high as 10 weight % the doping level for ytterbium is typically around 3.0 weight %.

As the person skilled in the art will appreciate, the type of dopant used and the level of doping is dependant on the required pump and lasing wavelengths and powers of the laser. Typically, the dopant distribution follows the refractive index profile, although this is not essential to the operation of the laser.

It has been discovered by the applicants that efficient monomode lasing with a wavelength of 1.02 $\mu$m can be achieved by doping the multimode fibre, which exhibits multimode behaviour at the pump and lasing wavelengths, with, typically, up to 3 weight % ytterbium and up to 4 weight % alumina in a silica host, and pumping the multimode fibre at substantially 980 nm. Germania may also be included as an index-raising co-dopant, although, with such a high concentration of ytterbium, which itself would raise the index to a sufficiently high level, germania would probably not be required when ytterbium is the laser host.

The monomode fibre can be a normal monomode, probably telecommunications standard, silica fibre, doped with germania to a level of up to 10% or more to allow the writing of optical gratings into the refractive index of the fibre.

A further variable which is associated with the gain of the system is the allowable length of the multimode fibre. As already mentioned, the applicants have discovered that the fundamental mode of a multimode fibre can travel for up to a meter without significant coupling into higher order modes. However, this distance is highly dependent on the nature of the fibre, any significant imperfections causing intermode coupling. Therefore the distance the fundamental mode could travel without coupling to higher order modes would be far greater in the, notional, perfect fibre than in a practical fibre with many imperfections.

With a level of ytterbium between 0.5 and 5.0 weight %, the length of the multimode fibre would typically not need to be as great as 1 meter, and thus fibre length is not a significant constraint in terms of performance reduction for the present system.

The reflectivity of the reflector in the monomode fibre waveguide portion can also be traded off against other parameters. If the losses due to mismatch between fibres at the splice boundary are low, the reflectivity of grating $g_2$ can be high, since there will only be a small loss incurred every time light is reflected back over the boundary. Conversely, if the mismatch losses are high then reflectivity should be low to minimise the amount of light which is reflected across the boundary. Mismatch can be calculated quite easily using overlap integral analysis which is well known in the art.

The operation of the laser can be described, in simple terms, with reference to FIG. 1. Although the fundamental mode of a multimode fibre waveguide is probably the first one to reach threshold, higher order modes may well start oscillating when pumped well above threshold. Therefore, the present system forces oscillation in the fundamental mode and actively prevents lasing in the higher order modes in the following way: oscillation of the fundamental mode only is forced by the monomode fibre waveguide and grating $g_2$ which is written into the monomode fibre waveguide. The grating partially reflects the fundamental mode signal back into the multimode fibre waveguide, the multimode fibre waveguide being short enough such that the reflected fundamental mode signal does not couple to higher order modes. The grating, $g_2$, in the monomode fibre waveguide, in effect, ensures partial reflection of only the fundamental mode, which increases discrimination against higher order modes in the multimode fibre.

This discrimination makes it difficult for other modes to oscillate. It is the partial reflection which supplies the feedback in the system. Therefore, due to highly predominant fundamental mode oscillation, emission is stimulated in the fundamental mode only. Due to this accessibility of the population by the fundamental mode, it is possible for the present laser system to approach 100% quantum efficiency and is limited only by guide imperfections and mismatch between the guides and loss mechanisms in the doped fibre.

An alternative reflector arrangement incorporating mirrors ($R_1$, $R_2$) in place of gratings is illustrated in FIG. 2. In the same way that gratings define the cavity in FIG. 1, mirrors ($R_1$, $R_2$) are positioned at the free ends of the coupled fibres to define the cavity, the mirrors having the necessary reflectivities and transmittances to provide the conditions for lasing, which are well known in the art. In fact, any form of mirror, for example, fibre loop mirrors, or combination of mirrors and gratings, could be used to achieve the same effect.

Although mirrors can be used to define the optical cavity, gratings have the advantage that a high degree of wavelength selectivity can be designed into the gratings, where the skilled person would be able to design the gratings to the correct wavelength selectivity.

Therefore, as long as some form of reflector arrangement with the required reflectivities is present in the system, whether they are internal reflectors written into the waveguides, external reflectors, or a combination of internal and external reflectors, the system should operate as described.

For commercial purposes it would be possible to combine the LDA and manipulating arrangement, which may include a CGH or lenses or a combination of both, in a single package. The package could be provided with a fibre tail, which is an integral part of the package, which would simply need to be connected, preferably by fusion splicing, to the multimode fibre waveguide of the laser cavity. The fibre tail of the package would be chosen to match the fibre to which it would be coupled in use, for example they would match in mode spot size, etc., and might be identical to the multimode fibre of the laser but without the laser dopant(s).

Using the fusion splicing method would mean that a feedback means such as an input grating would need to be provided at the input end of the cavity, for example, written into the multimode fibre waveguide portion to act as a reflector to define the input end of the cavity.

One application for a laser according to the present invention is to provide a high power, monomode pump source for a fibre laser amplifier. This application requires that the input fibre of the laser is multimode at both the pump and lasing wavelengths, and that the pump wavelength is substantially smaller than the lasing wavelength.

Although the above mentioned arrangement of laser produces an output signal with a wavelength that is longer than its pump signal wavelength, a similar arrangement is also capable of supporting up-conversion lasing. Typically, in an up-conversion laser system, the pump wavelength is longer than the lasing wavelength. The up-conversion mechanism is one which is known in the art. In effect, up-conversion relies on a sequential absorption mechanism which can be, for example, by either ion-ion interactions or multiple photon absorption which can promote a single ion to a higher energy state. If the energy level of the higher state is greater than the pump photon energy, there exists the possibility of an up-conversion laser in which the lasing wavelength is shorter than the pump wavelength.

A specific up-conversion application for a laser according to the present laser is an up-conversion pumped thulium-doped fluoride fibre laser capable of laser action in the blue part of the visible spectrum.

In a blue up-conversion fibre laser according to the present invention both the first and second fibre portions can be optimised for the input pump wavelength and the output signal wavelength respectively. Optimisation requires the first fibre portion to be monomode at the pump wavelength, rather than few-moded, and requires the second fibre portion to be monomode at the lasing wavelength. The optimum input pump signal wavelength for the laser is around 1.12 $\mu$m. Any pump source can be used which produces a 1.12 $\mu$m signal. The blue up-conversion laser incorporates a thulium-doped fluoride fibre input waveguide portion and a germania-doped silica output fibre waveguide portion into which a partially reflecting grating can be written. To provide the intensity of pump input required to promote up-conversion lasing at very short wavelengths, it is preferable to pump the input fibre waveguide portion with a high intensity, preferably, monomode source. To accommodate this, it is necessary for the input fibre waveguide portion to be monomode at the input pump wavelength and multimode at the lasing wavelength.

Thus, the fibres are arranged so that the input, thulium-doped fluoride fibre is monomode when pumped at around 1.12 $\mu$m and has a fundamental lasing mode at around 480 nm, due to up-conversion, which matches the fundamental mode of the output, germanium-doped silica fibre.

Conveniently, one form of the present invention, in which the input fibre waveguide portion is a neodymium-doped silica fibre, co-doped with germania or alumina or both, and the output fibre waveguide portion is a germania-doped silica fibre, produces a highly tunable output around the 1.1 $\mu$m region when pumped at around 800 nm, which could be used as the pump source for the up-conversion laser.

FIG. 3 shows a possible configuration for the up-conversion laser in which first and second gratings ($g_1$, $g_2$) including first and second fibre waveguide portions (1$a$, 2$a$) defined the first optical cavity. The optical cavity is pumped by a LDA (3) which produces an output focused, by a CGH (4), into the end of the first fibre waveguide portion. The first optical cavity produces a laser output which couples directly into third and fourth fibre waveguide portions (1$b$, 2$b$). A second optical cavity is defined by gratings $g_3$ and $g_2$ and includes the third and fourth fibre waveguide portions. The reason for positioning grating $g_3$ in silica-hosted fibre waveguide portion 2$a$ and not in fluoride-hosted fibre waveguide portion 1$b$ is that optically written gratings are more readily formed in silica doped with germania than in fluoride fibres.

Another up-conversion laser according to the present invention includes first and second waveguide portions, where the first waveguide portion is a fluoride fibre doped with $Pr^{3+}$ (praseodymium) and $Yb^{3+}$ (ytterbium) ions. The mechanics of the up-conversion process are described in detail in "Red up-conversion Yb-sensitised Pr fluoride fibre laser pumped in 0.8 $\mu$m region", Electronics Letters, Vol. 27, No. 13, pp. 1156–1157, the contents of which are incorporated herein by this reference. In this case, the $Yb^{3+}$ concentration is quite high, at around 2% (by weight) to ensure a high probability of close proximity between the $Yb^{3+}$ ions and the $Pr^{3+}$ ions, at a concentration of around 0.1% (by weight). This co-doping arrangement facilitates an energy transfer mechanism whereby a pump beam is launched into the first waveguide at around 810–860 nm and is absorbed by $Yb^{3+}$ ions which are promoted to the $^4F_{5/2}$ energy level: $Pr^{3+}$ ions do not absorb 810–860 nm light from the ground state. The $^4F_{5/2}$ energy level of the $Yb^{3+}$ ions is sufficiently close to the $^1G_4$ $Pr^{3+}$ energy level that energy transfer to the $^1G_4$ level of the $Pr^{3+}$ ions occurs. Such energy transfer may be direct, as in this case, or may be by an indirect route, for example by a route including one or more intermediate, non-radiative transitions. From there, absorption of a further pump photon at around 810–860 nm takes place promoting an ion to the $^3P_1$ energy level. After non-radiative decay to the $^3P_0$ level, which has a lifetime capable of supporting a population inversion above the $^3F_2$ level, lasing can occur at around 635 nm.

Typically, the co-doped up-conversion fibre arrangement includes a co-doped fibre having a $\Delta n$ of around 0.01, a core diameter of around 5.7 μm and a length of around 75 cm. A suitable pump for the system is a Ti:sapphire laser which provides a power of around 250 mW at 849 nm. Of course, a suitable array of semiconductor diodes at about this wavelength, and of similar or greater power, could be used instead. Then, a CGH could be used, as described above, to circularise the output of the array, and enable the efficient launch of pump light into the input fibre waveguide.

As for the thulium-doped up-conversion system described above, for the $Yb^{3+}/Pr^{3+}$ system the first waveguide portion is optimised to be monomode at the pump wavelength of around 849 nm, however, as already mentioned, non-optimised operation in which the waveguide supports the pump wavelength in more than one mode is possible. The second waveguide portion, again typically silica-based, is optimised to be monomode at the lasing wavelength of around 635 nm. A suitable optically written, partially reflecting grating arrangement for the second waveguide portion has a partial reflectivity at around 635 nm of about 60%. As before, all values stated may be traded-off in accordance with specific requirements. This up-conversion system is peculiar in that the pump and lasing wavelengths are relatively close together. Therefore, both wavelengths may be arranged to fall beyond the cut-off wavelength of the first waveguide portion, thus providing monomode lasing without a need for the second waveguide portion. However, to fully optimise the system for maximum pump light efficiency, the pump wavelength is arranged to be at the cut-off wavelength of the first waveguide portion and then lasing is supported in more than one mode, requiring the second waveguide portion to force single mode operation. Typically, up-conversion pumping and lasing wavelengths are not so close together and the system according to the present invention is preferred.

A further up-conversion laser according to the invention incorporates $Pr^{3+}$ as a lasing dopant, and implements a double pumping scheme to provide up-conversion lasing. The particular details of this up-conversion process are described in "CW room temperature up-conversion lasing at blue, green and red wavelengths in infrared-pumped $Pr^{3+}$-doped fluoride fibre", Electronics Letters, Vol. 27, No. 14, pp 1307–1309, which is incorporated herein by this reference.

In this system, a dual-wavelength pump is provided to excite ions, in a two-stage process, to upper energy levels. This process is similar to the ESA process described above except a first pump beam at 1.01 μm provides excitation of $Pr^{3+}$ ions to the $^1G_4$ energy level and a second pump beam at 835 nm provides excitations of ions at the $^1G_4$ energy level to the $^3P_1$ level. From the $^3P_1$ level, either radiative decay occurs to the $^3H_5$ level emitting light at 520 nm, or non-radiative decay from the $^3P_1$ level to the $^3P_0$ level followed by radiative decay to one of the $^3H_4$, $^3H_5$ or $^3F_2$ levels occurs emitting light at 491 nm, 605 nm or 635 nm respectively.

A suitable host for the first fibre waveguide portion in this system has a ZBLANP core doped with $Pr^{3+}$ to a level of around 650 ppm (by weight) and having a cladding of ZBLAN glass. A first Ti: sapphire laser tuned to 1.01 μm is used to excite ions from the $^3H_4$ ground state to the $^1G_4$ multiplet. A second Ti: sapphire laser tuned to 835 nm is used to provide excitation from the $^1G_4$ multiplet to the thermally coupled $^3P_1$, $^1I_6$ and $^3P_0$ levels. The actual light emission wavelength is dependent on a wavelength selective reflector on the output of the laser cavity, for example the cavity illustrated in FIG. 1, and also on the pump powers supplied to the first fibre waveguide portion. Again, to facilitate the writing of an optical grating into the second fibre waveguide portion to act as the wavelength selective reflector, the fibre is germania-doped silica.

Lasers which emit light in the blue or green part of the visible spectrum have very wide application, especially in fields where a very narrow beam width is an advantage, for example, reading from or writing to highly integrated computer memories.

Other applications for blue lasers include high brightness visual displays and scanning equipment for medical diagnosis of human or animal cells.

The skilled person will realise that although only a few specific examples of laser configuration have been discussed, the present invention has very wide application in the field of monomode lasers, whether they are up-conversion lasers or non up-conversion lasers.

We claim:

1. A laser comprising:
 a) an optical pump source to provide pump light at a wavelength of $\lambda_1$; and
 b) an optical cavity pumped in use by said optical pump source, said optical cavity being defined by first and second feedback means and said optical cavity including:
 c) a first waveguide portion which is capable of laser action with an emission at a wavelength of $\lambda_2$ when pumped at a wavelength of $\lambda_1$, said first waveguide portion exhibiting multi-transverse mode behavior at $\lambda_2$; and
 d) a second waveguide portion optically coupled to the first waveguide portion, said second waveguide portion exhibiting substantially single transverse mode behavior at $\lambda_2$.

2. A laser according to claim 1 in which the first and second waveguide portions comprise optical fibres.

3. A laser according to claim 2 in which the second feedback means is a wavelength selective optical grating, said grating being formed in the second optical fibre.

4. A laser according to claim 2 in which the first feedback means is an optical grating which is formed in the first optical fibre, the grating being highly transmissive at wavelength $\lambda_1$ and highly reflective at wavelength $\lambda_2$.

5. A laser according to claim 1 further comprising a coupling means to couple the pump signal from the optical source into the first waveguide portion.

6. A laser according to claim 5 in which the coupling means is a computer generated hologram.

7. A laser according to claim 1 wherein the fundamental mode spot size of the first waveguide portion at wavelength $\lambda_2$ is substantially the same as the fundamental mode spot size of the second waveguide portion at wavelength $\lambda_2$.

8. A laser according to claim 1 wherein the arrangement is such that substantially only the fundamental mode of the first waveguide portion couples into the second waveguide portion at a wavelength of $\lambda_2$.

9. A laser according to claim 1, in which the second waveguide portion comprises silica.

10. A laser according to claim 9 in which the second waveguide portion is doped with germania.

11. A laser according to claim 1 in which the first waveguide portion comprises silica.

12. A laser according to claim 11 in which the first waveguide portion is co-doped with alumina and germania.

13. A laser according to claim 1 wherein the optical source is a diode array with an output power of at least 1 watt.

14. An up-conversion fibre laser which exhibits laser action at a lasing wavelength when pumped with at least one pump wavelength substantially longer than the lasing wavelength, the laser comprising:

a) at least one optical source to provide a pump signal at the or each pump wavelength; and b) an optical cavity, the optical cavity being defined by feedback means and including:

c) a first fibre waveguide portion which is capable of laser action with a multi-traverse mode emission at the lasing wavelength when it is optically pumped at the or each pump wavelength; and d) a second fibre waveguide portion which is optically coupled to the first fibre waveguide portion, said second fibre waveguide portion exhibiting substantially single-transverse mode behavior at the lasing wavelength.

15. An up-conversion laser according to claim 14 which produces a laser output at the lasing wavelength which is in the blue region of the visible spectrum.

16. An up-conversion laser according to claim 15 in which the first fibre waveguide portion comprises a fluoride host and is doped with thulium.

17. An up-conversion laser according to claim 14 in which the optical pump comprises a laser according to claim 1.

18. An up-conversion laser according to claim 17 in which the first waveguide portion of the pump contains neodymium as a laser dopant.

19. An up-conversion laser according to claim 14 in which the first fibre waveguide portion is doped with at least one dopant species, and the laser includes two pump sources, wherein a first pump source provides dopant ion excitation from a first level to a second level and a second pump source provides dopant ion excitation either directly or indirectly from the second level to a third level.

20. An up-conversion laser according to claim 14 comprising a first fibre waveguide portion co-doped with two or more dopant species, wherein optical pumping at a single pump wavelength provides excitation of ions of a first one of the dopant species, said excitation being from a first level to a second level, and wherein energy of ions of the first one of the dopant species at the second energy level is transferred to ions of a second one of the dopant species at a third energy level, said third energy level being substantially equal to the second energy level, and further absorption of energy by said ions at the third energy level excites the ions to a fourth energy level.

21. An up-conversion laser according to claim 19, wherein one dopant species comprises $Pr^{3+}$ ions.

22. An up-conversion laser according to claim 21, wherein a second dopant species comprises $Yb^{3+}$ ions.

23. A laser comprising a pump source, and an optical cavity comprising a pair of reflectors, and positioned therebetween an optical waveguide comprising two optically coupled waveguide portions, the first of the two waveguide portions being doped with one or more dopant species and providing at least one lasing transition therefrom for producing an emission supported in said waveguide in more than one transverse mode, the second of the two waveguide portions being arranged to support said emission in only a single transverse mode, the pump source having one or more wavelength components for exciting ions of said dopant species to one or more higher energy levels.

24. A laser according to claim 1 further comprising means for coupling light from the pump source into the first of the two waveguides of the optical cavity.

25. A method of providing monomode laser light by coupling pump light having one or more wavelength components into an optical waveguide, said optical waveguide having:

a) at least two waveguide portions of which a first waveguide portion is doped with one or more dopant species providing at least one lasing transition, and b) a pair of partially reflecting reflectors defining an optical cavity about the waveguide, the pump light causing emission of light from said lasing transition supported in said first waveguide portion in multiple transverse modes and supported in a second one of said waveguide portions in a single transverse mode, wherein the optical cavity provides lasing due to feedback provided by the reflectors, said lasing being only in the single mode defined by the second waveguide portion.

* * * * *